United States Patent
Wong et al.

(10) Patent No.: US 11,418,549 B2
(45) Date of Patent: Aug. 16, 2022

(54) INTERNET PROTOCOL (IP) MULTIMEDIA SUBSYSTEM (IMS) LEVEL AWARENESS OF HIGH LATENCY DEVICE

(71) Applicant: NOKIA SOLUTIONS AND NETWORKS OY, Espoo (FI)

(72) Inventors: Curt Wong, Bellevue, WA (US); John Juha Antero Rasanen, Espoo (FI); Peter Leis, Penzberg (DE); Devaki Chandramouli, Plano, TX (US); Alexander Milinski, Munich (DE); Martin Oettl, Weilheim (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 16/064,878

(22) PCT Filed: Dec. 21, 2016

(86) PCT No.: PCT/US2016/068056
§ 371 (c)(1),
(2) Date: Jun. 21, 2018

(87) PCT Pub. No.: WO2017/112785
PCT Pub. Date: Jun. 29, 2017

(65) Prior Publication Data
US 2018/0375902 A1    Dec. 27, 2018

Related U.S. Application Data

(60) Provisional application No. 62/270,318, filed on Dec. 21, 2015.

(51) Int. Cl.
*H04L 65/10*    (2022.01)
*H04W 8/08*    (2009.01)
(Continued)

(52) U.S. Cl.
CPC ...... *H04L 65/1006* (2013.01); *H04L 65/1016* (2013.01); *H04W 8/08* (2013.01);
(Continued)

(58) Field of Classification Search
CPC ........... H04L 65/1006; H04L 65/1016; H04W 52/02; H04W 52/0274; H04W 60/00;
(Continued)

(56) References Cited

U.S. PATENT DOCUMENTS 7,564,840 B2 *   7/2009   Elliott .................. H04L 65/605
                                                              370/356
9,055,520 B2     6/2015   Salot et al.
(Continued)

FOREIGN PATENT DOCUMENTS

CN    1894911 A     1/2007
CN    101729536 A   6/2010
(Continued)

OTHER PUBLICATIONS

Jul. 12, 2019 Supplementary Office Action issued in European Patent Application No. 16880035.7.
(Continued)

*Primary Examiner* — Shah M Rahman
(74) *Attorney, Agent, or Firm* — Squire Patton Boggs (US) LLP

(57) ABSTRACT

Systems, methods, apparatuses, and computer program products for providing IMS level awareness of high latency device are provided. One method, when a UE attaches to EPC, receiving, at a network node, an indication that the UE is a high latency device. The method may also include assigning, to the UE, an IP address selected from a special IP address range that is designated specifically for high latency devices. When the UE performs IMS registration, the method may include determining that the UE is a high
(Continued)

When the UE moves to idle mode (e.g., ECM-IDLE) or is released from RRC connection, sending an indication to a network node of the actual time in which the UE is still reachable from network paging and the actual sleep duration period of the UE — 500 latency UE based on the UE's IP address provided with the IMS registration request and assigned during the EPC attach procedure.

16 Claims, 5 Drawing Sheets

(51) Int. Cl.
- *H04W 60/00* (2009.01)
- *H04W 52/02* (2009.01)
- *H04W 68/00* (2009.01)
- *H04L 65/1016* (2022.01)
- *H04W 76/28* (2018.01)

(52) U.S. Cl.
CPC ....... *H04W 52/02* (2013.01); *H04W 52/0274* (2013.01); *H04W 60/00* (2013.01); *H04W 68/00* (2013.01); *H04W 76/28* (2018.02)

(58) Field of Classification Search
CPC ....... H04W 68/00; H04W 76/28; H04W 8/08; H04W 52/0212
See application file for complete search history.

(56) References Cited

U.S. PATENT DOCUMENTS

| | | | | |
|---|---|---|---|---|
| 10,321,512 | B2* | 6/2019 | Zhao | H04W 24/08 |
| 2004/0184452 | A1 | 9/2004 | Huotari et al. | |
| 2005/0059384 | A1* | 3/2005 | Kuusinen | H04M 1/575 |
| | | | | 455/414.1 |
| 2005/0117591 | A1 | 6/2005 | Hurtta et al. | |
| 2008/0162637 | A1* | 7/2008 | Adamczyk | H04L 51/043 |
| | | | | 709/204 |
| 2008/0172486 | A1* | 7/2008 | Danne | H04L 65/1073 |
| | | | | 709/224 |
| 2010/0153559 | A1 | 6/2010 | Yu | |
| 2011/0028130 | A1* | 2/2011 | Swaminathan | H04M 3/42195 |
| | | | | 455/414.1 |
| 2011/0171925 | A1* | 7/2011 | Faccin | H04W 36/24 |
| | | | | 455/404.1 |
| 2011/0201343 | A1 | 8/2011 | Pinheiro et al. | |
| 2012/0011368 | A1 | 1/2012 | Zhu | |
| 2012/0102211 | A1 | 4/2012 | Dahl | |
| 2012/0164954 | A1* | 6/2012 | Karampatsis | H04W 60/04 |
| | | | | 455/67.11 |
| 2012/0269141 | A1 | 10/2012 | Ha | |
| 2014/0301258 | A1 | 10/2014 | Belghoul | |
| 2015/0011210 | A1* | 1/2015 | Drevon | H04W 60/005 |
| | | | | 455/435.2 |
| 2015/0063225 | A1* | 3/2015 | Kanamarlapudi | H04L 67/24 |
| | | | | 370/329 |
| 2015/0103721 | A1* | 4/2015 | Yi | H04W 4/70 |
| | | | | 370/311 |
| 2015/0109966 | A1 | 4/2015 | Hong et al. | |
| 2015/0119092 | A1* | 4/2015 | Yi | H04W 4/14 |
| | | | | 455/466 |
| 2015/0271755 | A1* | 9/2015 | Karri | H04W 28/0221 |
| | | | | 370/252 |
| 2016/0088420 | A1* | 3/2016 | Kim | H04W 4/70 |
| | | | | 370/328 |
| 2016/0100375 | A1* | 4/2016 | Chiduruppa | H04L 65/1016 |
| | | | | 455/435.1 |
| 2016/0286385 | A1* | 9/2016 | Ryu | H04W 76/28 |
| 2016/0316514 | A1* | 10/2016 | Zhao | H04W 8/22 |
| 2017/0164286 | A1* | 6/2017 | Jeong | H04W 8/02 |
| 2017/0188303 | A1* | 6/2017 | Bas Sanchez | H04W 48/02 |
| 2017/0195822 | A1* | 7/2017 | Watfa | H04W 4/08 |
| 2017/0339641 | A1* | 11/2017 | Nigam | H04W 16/14 |
| 2018/0176883 | A1* | 6/2018 | Fujishiro | H04W 52/0206 |
| 2018/0176979 | A1* | 6/2018 | Ryu | H04W 8/08 |

FOREIGN PATENT DOCUMENTS

| | | |
|---|---|---|
| CN | 102754518 A | 10/2012 |
| CN | 102804685 A | 11/2012 |
| CN | 104768236 A | 7/2015 |
| JP | 2006-517064 A | 7/2006 |
| WO | WO 2014/118351 A1 | 8/2014 |
| WO | WO 2015/153589 A1 | 10/2015 |

OTHER PUBLICATIONS

"3rd Generation Partnership Project; Technical Specification Group Services and System Aspects; Study on Machine-Type Communications (MTC) and other mobile data applications communications enhancements (Release 12)", 3GPP Standard; 23887-C00, 3rd Generation Partnership Project (3GPP)?, Mobile Compentence Centre; 650, Routes Des Lucioles; F-06921 Sophia-Antipolis Cedex; France, Dec. 20, 2013.

Jun. 26, 2019 Extended Search Report issued in European Patent Application No. 16880035.7.

3Rd Generation Partnership Project; Technical Specification Group Services and System Aspects; Study on Machine-Type Communications (MTC) and other mobile data applications communications enhancements (Release 12), 3GPP TR 23.887 V12.0.0, Dec. 12, 2013, pp. 92-101. http://www.3gpp.org/ftp/Specs/archive/23_series/23.887/23887-c00.zip.

3Rd Generation Partnership Project; Technical Specification Group Services and System Aspects; Study on optimizations to support high latency communications; Stage 2 (Release 13), 3GPP TR 23.709 V13.0.0, Jun. 2015, pp. 27-30. http://www.3gpp.org/ftp/Specs/archive/23_series/23.709/23709-d00.zip.

Apr. 22, 2019 Office Action issued in Japanese Patent Application No. 2018-532695.

International Search Report & Written Opinion dated Mar. 10, 2017 corresponding to International Patent Application No. PCT/US2016/068056.

Japanese Office Action issued in corresponding Japanese Patent Application No. 2018-532695 dated Mar. 2, 2020.

Chinese Office Action issued in corresponding Chinese Patent Application No. 201680082276.6 dated Jul. 3, 2020.

Indian Office Action issued in corresponding Indian Patent Application No. 201817023902 dated Jun. 11, 2020.

Chinese Office Action issued in corresponding Chinese Patent Application No. 201680082276.6 dated Feb. 3, 2021.

European Communication pursuant to Article 94(3) EPC, corresponding to EP Appln. No. 16 880 035.7, dated Jun. 25, 2021.

Chinese Office Action issued in corresponding Chinese Patent Application No. 201680082276.6 dated Sep. 2, 2021.

* cited by examiner

INTERNET PROTOCOL (IP) MULTIMEDIA SUBSYSTEM (IMS) LEVEL AWARENESS OF HIGH LATENCY DEVICE

CROSS-REFERENCE TO RELATED APPLICATIONS

This application claims priority from U.S. Provisional Application No. 62/270,318, filed on Dec. 21, 2015. The entire contents of this earlier filed application are hereby incorporated by reference in their entirety.

BACKGROUND

Field

Embodiments of the invention generally relate to wireless or mobile communications networks, such as, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A), future 5G radio access technology, and/or High Speed Packet Access (HSPA). For example, some embodiments may relate to Internet Protocol Multimedia Subsystem (IMS) awareness of user equipment (UE) taking power nap.

Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN), no RNC exists and radio access functionality is provided in the evolved Node B (eNodeB or eNB) or many eNBs. Multiple eNBs are involved for a single UE connection, for example, in case of Coordinated Multipoint Transmission (CoMP) and in dual connectivity.

Long Term Evolution (LTE) or E-UTRAN provides a new radio access technology and refers to the improvements of UMTS through improved efficiency and services, lower costs, and use of new spectrum opportunities. In particular, LTE is a 3GPP standard that provides for uplink peak rates of at least, for example, 75 megabits per second (Mbps) per carrier and downlink peak rates of at least, for example, 300 Mbps per carrier. LTE supports scalable carrier bandwidths from 20 MHz down to 1.4 MHz and supports both Frequency Division Duplexing (FDD) and Time Division Duplexing (TDD).

As mentioned above, LTE may also improve spectral efficiency in networks, allowing carriers to provide more data and voice services over a given bandwidth. Therefore, LTE is designed to fulfill the needs for high-speed data and media transport in addition to high-capacity voice support. Advantages of LTE include, for example, high throughput, low latency, FDD and TDD support in the same platform, an improved end-user experience, and a simple architecture resulting in low operating costs.

Certain releases of 3GPP LTE (e.g., LTE Rel-11, LTE Rel-12, LTE Rel-13) are targeted towards international mobile telecommunications advanced (IMT-A) systems, referred to herein for convenience simply as LTE-Advanced (LTE-A). LTE-A is directed toward extending and optimizing the 3GPP LTE radio access technologies. A goal of LTE-A is to provide significantly enhanced services by means of higher data rates and lower latency with reduced cost. LTE-A is a more optimized radio system fulfilling the international telecommunication union-radio (ITU-R) requirements for IMT-Advanced while keeping the backward compatibility.

Internet Protocol Multimedia Subsystem (IMS) is an architectural framework for delivering internet protocol (IP) multimedia services to UEs. IMS uses Internet Engineering Task Force (IETF) protocols, such as Session Initiation Protocol (SIP), wherever possible. IMS is generally intended to aid the access of multimedia and voice applications from wireless and wireline terminals.

SUMMARY

One embodiment is directed to a method, which may include subscribing, by an access server, to event notifications for at least one user equipment. The subscribing may include indicating to a subscriber server that the access server wants to receive status information for the at least one user equipment. The method may further include receiving, from the subscriber server, status information for the at least one user equipment.

Another embodiment is directed to an apparatus including at least one processor and at least one memory including computer program code. The at least one memory and the computer program code are configured, with the at least one processor, to cause the apparatus at least to subscribe to event notifications for at least one user equipment, for example, by indicating to a subscriber server that the apparatus wants to receive status information for the at least one user equipment. The at least one memory and the computer program code are further configured, with the at least one processor, to cause the apparatus at least to receive, from the subscriber server, status information for the at least one user equipment.

Another embodiment is directed to an apparatus that may include subscribing means for subscribing to event notifications for at least one user equipment. The subscribing means may include means for indicating to a subscriber server that the apparatus wants to receive status information for the at least one user equipment. The apparatus may further include receiving means for receiving, from the subscriber server, status information for the at least one user equipment.

Another embodiment is directed to a method, which may include receiving, at a subscriber server associated with at least one user equipment, an indication that an access server wants to receive status information for the at least one user equipment, sending a request to a mobility management entity to be notified when the least one user equipment is active, when the at least one user equipment becomes active, receiving an indication that the at least one user equipment is active and an indication of a duration that the at least one user equipment will be active, and sending the status information for the at least one user equipment to the access server. The status information may include the indication that the at least one user equipment is active and the indication of a duration that the at least one user equipment will be active.

Another embodiment is directed to an apparatus including at least one processor and at least one memory including computer program code. The at least one memory and the computer program code are configured, with the at least one processor, to cause the apparatus at least to receive an indication that an access server wants to receive status information for at least one user equipment, send a request to a mobility management entity to be notified when the least one user equipment is active, when the at least one user equipment becomes active, receive an indication that the at least one user equipment is active and an indication of a duration that the at least one user equipment will be active, and send the status information for the at least one user equipment to the access server. The status information may include the indication that the at least one user equipment is active and the indication of a duration that the at least one user equipment will be active.

Another embodiment is directed to an apparatus that may include receiving means for receiving an indication that an access server wants to receive status information for at least one user equipment, transmitting means for sending a request to a mobility management entity to be notified when the least one user equipment is active, when the at least one user equipment becomes active, receiving means for receiving an indication that the at least one user equipment is active and an indication of a duration that the at least one user equipment will be active, and transmitting means for sending the status information for the at least one user equipment to the access server. The status information may include the indication that the at least one user equipment is active and the indication of a duration that the at least one user equipment will be active.

BRIEF DESCRIPTION OF THE DRAWINGS

For proper understanding of the invention, reference should be made to the accompanying drawings, wherein.

DETAILED DESCRIPTION

Figure 1:
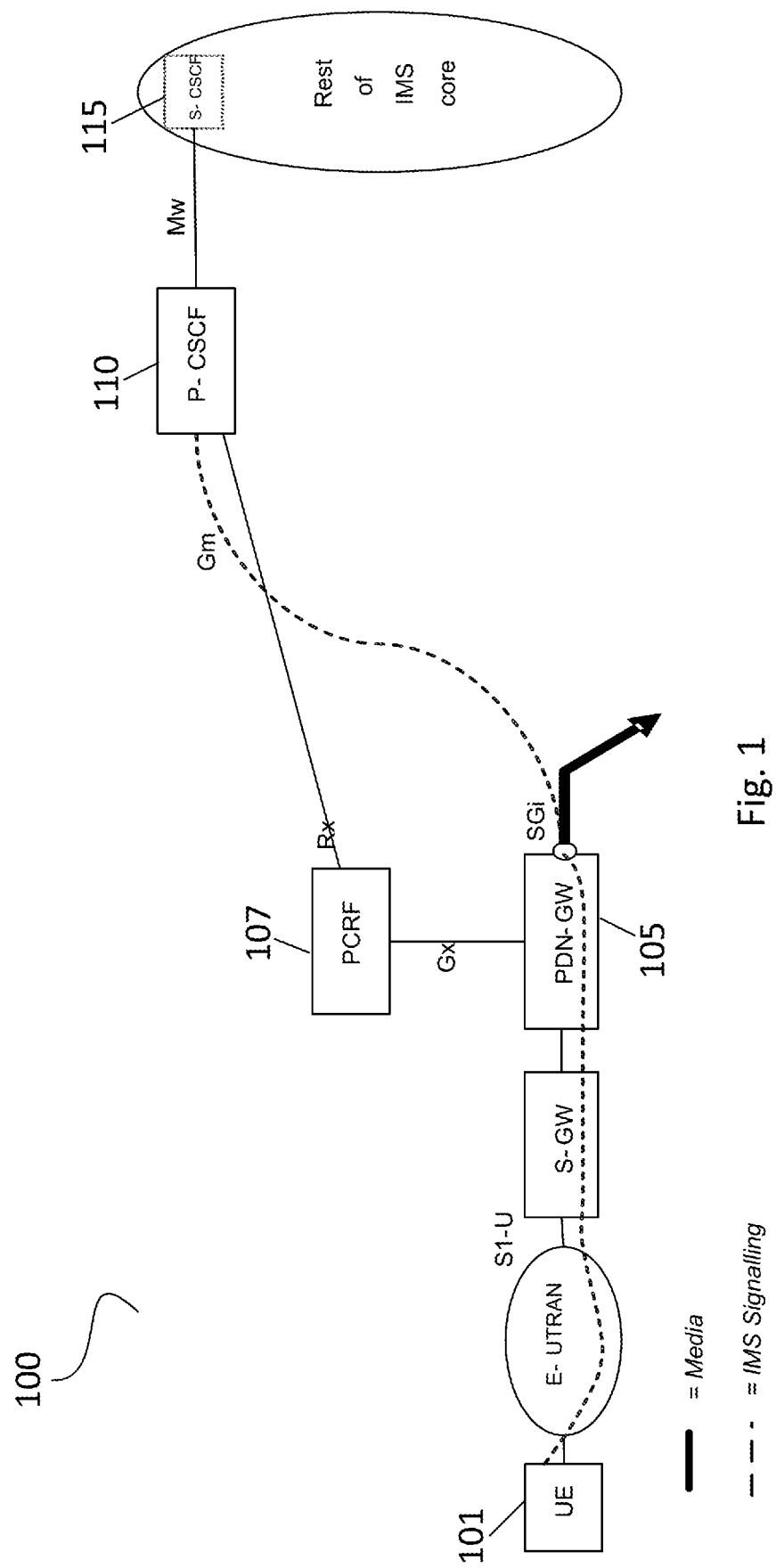
FIG. 1 illustrates a block diagram of an IMS network configuration, according to an embodiment.

It will be readily understood that the components of the invention, as generally described and illustrated in the figures herein, may be arranged and designed in a wide variety of different configurations. Thus, the following detailed description of embodiments of systems, methods, apparatuses, and computer program products for providing IMS level awareness of high latency device, as represented in the attached figures, is not intended to limit the scope of the invention, but is merely representative of some selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

User Equipment (UE) connected to a mobile network requires periodic update to the network in order to be reachable for terminating data communication (e.g., server initiated) for UE Power Saving Mode as defined in 3GPP TS 23.401. The time period between each update can be very long (e.g., 13 days) based on configuration. When the UE is in Power Saving Mode (e.g., "sleeping" by shutting off its radio receiver), the network will not be able to send any downlink data to the UE, and the sending entity (e.g., server) may re-transmit which causes unnecessary signaling within the network.

LTE allows certain UE to sleep for a long time, which may be referred to as high latency (HL) UE with power saving mode. In machine type communications (MTC), a way to avoid retransmission has been defined but IMS has not been taken into account. It would also be beneficial for IMS to be aware that the UE is high latency in order to avoid retransmission and therefore avoiding extra signaling to the network.

The Evolved Packet System (EPS), which is also known by the name of long term evolution (LTE) network, is the evolution of the general packet radio system (GPRS). EPS comprises the E-UTRAN Radio Access network and the Evolved Packet Core (EPC). EPS provides a new radio interface and new EPC network functions for broadband wireless data access.

3GPP has defined EPC level handling for the scenario where the UE is in power saving mode (PSM) to minimize the possibility that the server keeps retransmitting downlink data to a "sleeping" UE. That 3GPP study (in 3GPP TR 23.709) focuses on MTC devices (3GPP TS 23.682); hence, the solution defined applied mainly to MTC servers (Services Capability Server/Application Server) defined in 3GPP TS 23.682.

The 3GPP study has not considered the impact to IMS network if UE is also an IMS UE and supports Power Saving Mode or enhanced discontinuous reception (eDRX). For session setup in IMS, a proxy call session control function (P-CSCF) receives a terminating SIP message (e.g., INVITE) and this normally triggers sending a paging message towards the UE. But the EPC network may not page the UE since it is aware that the UE is unreachable and will not respond when it is in PSM mode (or running an extended DRX cycle). So P-CSCF needs to retransmit the message again (at least one time before discarding the message). This creates unnecessary signaling load in the network and wastes processing power in a number of network entities.

Another possible scenario with IMS is the support of an automated eCall device using IMS. An eCall-only UE may not send any location or periodic updates to the network until there is an accident and an automated emergency call is needed. The standardization activity for IMS eCall has just started and there exists no limitation regarding possible solutions at this point. It is possible that IMS eCall follows the circuit switched (CS) eCall solution that triggers network activity only when there is a need to do so (e.g., accident). However, it is also foreseeable that the IMS eCall UE may do more than just follow the CS eCall behaviour, which is that, after performing initial IMS registration and exchanging some parameters with the network, not communicating with IMS for a long period of time similar as an UE when invoking power saving mode. As a result, it is important for IMS to be aware of such "high latency" UEs which allows the IMS to set longer registration expiration timers than the currently allowed maximum duration (i.e., up to more than 1 week time).

Certain embodiments provide solutions to allow IMS to be aware of high latency devices (e.g., either in power saving mode or IMS UE that does not normally (re)-register to IMS for a long period like IMS eCall only device) in order to adapt IMS procedures accordingly.

FIG. 1 illustrates an example block diagram of an IMS network configuration 100 when using LTE access towards the EPC, according to embodiments of the invention.

In one embodiment, a dedicated IP address taken from a specific IP address range may be assigned to the high latency (HL) IMS device. According to this embodiment, when a UE 101 attaches to LTE/EPC and has indicated that the UE 101 is a HL device, then the IP address assigned by the EPC (i.e., assigned by the packet data network gateway 105) will be taken from a special IP address range which is designated for HL communication devices. In certain embodiments, the UE 101 may attach to LTE/EPC and indicate that the UE 101 is a HL device, for example, by requesting an "active time" (i.e., sending an PSM indication), requesting an eDRX time (i.e., sending an indication for requesting extended paging cycle in idle mode), requesting for a specific APN, or other alternatives.

The P-CSCF 110 may store the same configuration table containing the IP range designated for HL devices. When the UE performs IMS registration towards the P-CSCF 110 via Gm, the P-CSCF 110 is able to determine that this UE 101 is a HL IMS UE based on the UE's IP address provided within the SIP registration request and assigned to the UE 101 during the EPC attach procedure. Now, the P-CSCF 110 may use different (i.e., longer) retransmission timers for that UE 101 as it falls into HL's IP address range and was identified as being a HL device. This embodiment allows the P-CSCF 110 to adjust the retransmission timer to minimize the number of re-transmissions to HL IMS UEs.

Another embodiment may utilize an explicit IMS signaling indication. According to this embodiment, before the IMS UE 101 goes to sleep, the IMS application in the UE 101 may send an explicit indication via the Gm interface towards the IMS which indicates that the UE is not reachable anymore. The IMS UE 101 may also send information regarding future availability, such as the time/date of the next wake-up period (which would remove the need to send a message to indicate being available again). As a further embodiment, the IMS UE 101 may also send more versatile information about its future availability, such as regular cycles or a series of periods of availability (which remove the need for sending further "going to sleep" or "just woke up" messages until the UE changes the availability cycles or periods). A possible implementation may include the UE 101 using a SIP MESSAGE including a new SIP header field or a header field parameter (e.g., within the contact header field). Other encodings are possible as well.

In an embodiment, whenever UE 101 is awake, the IMS application in the UE 101 may send an explicit indication via Gm to the IMS that it is now reachable (again), unless any information on availability was already sent upon going to sleep. The receiver of such information may be the S-CSCF 115, which is aware of the IMS registration status and forwards any service requests towards the UE 101. This embodiment allows the IMS to avoid sending unnecessary SIP signaling towards the UE 101 and also prevents from having a total re-transmission issue when addressing HL IMS UEs. In addition, the reachability information may also be passed toward an IMS access server (AS) via S-CSCF 115 (Mw) so the IMS AS, acting as a source of service requests, can perform further optimization like buffering of terminating SIP messages. This embodiment may be applicable for non-real-time media, such as for SIP signaling that carries text messages.

In yet another embodiment, the EPC may send an indication to IMS network via the policy and charging control (PCC) framework. In the power saving mode feature as defined in 3GPP TS 23.401, the mobility management entity (MME) and the UE can negotiate the active time and periodic tracking area update (TAU) timer. Similarly, for eDRX, the MME and the UE can negotiate the eDRX timer. The MME also knows when the UE is going to power saving mode after it moves to EPS connection management (ECM)-IDLE from ECM-CONNECTED. Similarly, in case of eDRX, the MME assigns a paging time window length and provides this value to the UE during attach/TAU procedures together with the extended idle mode DRX cycle length. The first paging occasion is within the paging hyperframe. The UE is assumed to be reachable for paging messages for an additional paging time window length after the first paging occasion.

In this embodiment, when the UE 101 goes to ECM-IDLE, (e.g., eNB releases the UE from RRC connection), the MME indicates to P-GW 105 the actual time in which the UE 101 is still reachable from network paging and the actual sleep duration period. The P-GW 105 may indicate both information to the PCRF 107 via the Gx interface (i.e., the time remaining for reachability and the sleep period thereafter). The PCRF 107 may indicate the information via the Rx interface towards the P-CSCF 110.

This embodiment allows the P-CSCF 110 to know when the UE 101 is going to sleep and when the UE 101 is reachable again; thus it avoids total re-transmissions to HL IMS UEs. This also allows the IMS network to know when the UE is reachable. The information can be passed toward an IMS AS via the S-CSCF 115 (Mw) so an IMS AS can perform further optimizations in respects to when sending service request towards the UE 101.

In yet another embodiment, an IMS AS may subscribe to event notifications from MME via the HSS. In this embodiment, an IMS AS indicates to the HSS via Sh interface that it wishes to be notified if UE 101 is awake and reachable. In this embodiment, the HSS (via S6a) may request the MME to send a notification to the HSS whenever the UE 101 is reachable again and for how long it is reachable. When the UE 101 becomes active, the MME informs the HSS via S6a and about the duration for reachability. The MME may also notify the HSS when the UE 101 is going back to sleep (e.g., unreachable state) and for how long it is going back to sleep. The HSS may relay this status information back to IMS AS via Sh interface (e.g., status information: now reachable and for how long, now not reachable and for how long). The IMS AS can take this information into account and may avoid sending terminating SIP messages during the sleep period.

This embodiment allows the IMS AS to know when the UE 101 is going to sleep and when the UE 101 will be reachable again; thus it avoids unnecessary SIP signaling message to an UE that is not reachable. The AS can use this knowledge to buffer terminating SIP signaling messages if possible. This may be applicable for non-real-time media, e.g., for SIP signaling that carries text message.

Any of the above embodiments allow the IMS to be aware of HL UEs. In some of the described embodiments above, the network side is even aware of the sleep duration. However, the handling of SIP re-registration may be considered as well. According to 3GPP TS 24.229, the maximum internal for IMS re-registration timer is 600,000 seconds and S-CSCF 115 may decrease that value. Since HL UE may not be awake within 600,000 seconds because it went to sleep for a longer time, e.g., due to power saving mode with longer period, it should be possible for network side to handle this situation. One way is that the network does not expect a refresh of re-registration during the sleep duration. This allows the network to keep the UE context for a longer time as the UE may re-register immediate after the sleep duration is expired.

Figure 2A:
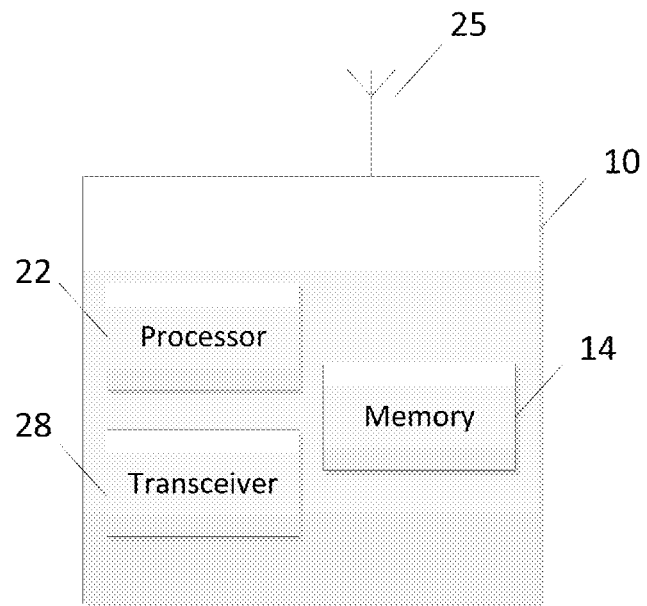
FIG. 2a illustrates a block diagram of an apparatus, according to one embodiment.

FIG. 2a illustrates an example of an apparatus 10 according to an embodiment. In an embodiment, apparatus 10 may be a node, host, or server in a communications network or serving such a network. For example, in certain embodiments, apparatus 10 may be a network node or access node for a radio access network, such as a base station e.g., NodeB (NB) in UMTS or eNodeB (eNB) in LTE or LTE-A, a P-CSCF, S-CSCF, MME, or access server in IMS. However, in other embodiments, apparatus 10 may be other components within a radio access network. It should be noted that one of ordinary skill in the art would understand that apparatus 10 may include components or features not shown in FIG. 2a.

As illustrated in FIG. 2a, apparatus 10 includes a processor 22 for processing information and executing instructions or operations. Processor 22 may be any type of general or specific purpose processor. While a single processor 22 is shown in FIG. 2a, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 may further include or be coupled to a memory 14 (internal or external), which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

In some embodiments, apparatus 10 may also include or be coupled to one or more antennas 25 for transmitting and receiving signals and/or data to and from apparatus 10. Apparatus 10 may further include or be coupled to a transceiver 28 configured to transmit and receive information. For instance, transceiver 28 may be configured to modulate information on to a carrier waveform for transmission by the antenna(s) 25 and demodulate information received via the antenna(s) 25 for further processing by other elements of apparatus 10. In other embodiments, transceiver 28 may be capable of transmitting and receiving signals or data directly.

Processor 22 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

In an embodiment, memory 14 may store software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In one embodiment, apparatus 10 may be a network node or access node, such as a base station in UMTS, an eNB in LTE or LTE-A, a P-CSCF, S-CSCF, PCRF, MME, or access server in IMS, for example. According to certain embodiments, apparatus 10 may be controlled by at least one memory 14 and at least one processor 22 to, when a UE attaches to EPC, receive an indication that the UE is a high latency device. In an embodiment, the indication may include an "active time" request (i.e., receiving a PSM indication), an eDRX time request (i.e., receiving an indication for requesting extended paging cycle in idle mode), a request for a specific APN, or other alternatives. Apparatus 10 may then be controlled by at least one memory 14 and at least one processor 22 to assign, to the UE, an IP address selected from a special IP address range that is designated specifically for high latency devices. In an embodiment, apparatus 10 may be controlled by at least one memory 14 and at least one processor 22 to store a configuration table containing the special IP address range designated for the high latency devices. When the UE performs IMS registration, apparatus 10 is able to determine that the UE is a high latency UE based on the UE's IP address provided with the IMS registration request and assigned during the EPC attach procedure. In one embodiment, apparatus 10 may be controlled by at least one memory 14 and at least one processor 22 to use longer retransmission timers for the UE as it is identified as being a high latency device based on its assigned IP address.

In another embodiment, apparatus 10 may be controlled by at least one memory 14 and at least one processor 22 to receive an explicit indication, from a UE, that the UE is no longer reachable. In one example embodiment, the explicit indication may be received in a new SIP header field or a header field parameter of a SIP message. According to an embodiment, apparatus 10 may be controlled by at least one memory 14 and at least one processor 22 to receive information regarding future availability of the UE. For example, the information regarding future availability may include the time/date of the next wake-up period. In another example, apparatus 10 may be controlled by at least one memory 14 and at least one processor 22 to receive more versatile information about future availability of the UE, such as regular cycles or a series of periods of availability. According to one embodiment, whenever the UE is awake again, apparatus 10 may be controlled by at least one memory 14 and at least one processor 22 to receive an explicit indication that the UE is now reachable.

In another embodiment, apparatus 10 may be controlled by at least one memory 14 and at least one processor 22, when the UE moves to idle mode (e.g., ECM-IDLE) or is released from RRC connection, to send an indication to a network node (e.g., P-GW, PCRF, and/or P-CSCF) of the actual time in which the UE is still reachable from network paging and the actual sleep duration period.

In another embodiment, apparatus 10 may be controlled by at least one memory 14 and at least one processor 22 to indicate to a subscriber server (e.g., HSS) associated with a UE that apparatus 10 wishes to be notified when the UE is awake and reachable. The subscriber server may then send a request to a MME to send a notification to the subscriber server when the UE is reachable again and for how long it is reachable. When the UE becomes active, the MME may inform the subscriber server that the UE is reachable and inform the subscriber server of the duration of reachability. The MME may also notify the subscriber server of when the UE is going back to sleep and for how long it is going back to sleep. Apparatus 10 may then be controlled by at least one memory 14 and at least one processor 22 to receive, from the subscriber server, status information for the UE, which may include information that the UE is reachable and for how long and/or information that the UE is not reachable and for how long. Apparatus 10 may then take this information into account and avoid sending terminating SIP messages to the UE during its sleep period.

Figure 2B:
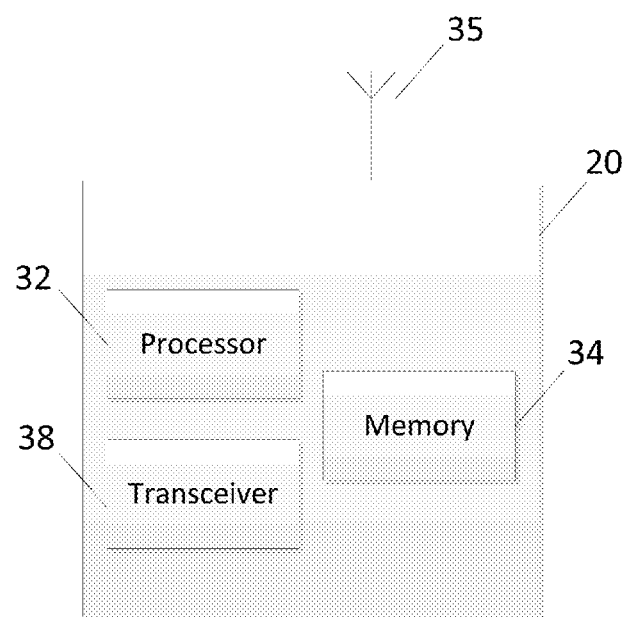
FIG. 2b illustrates a block diagram of an apparatus, according to another embodiment.

FIG. 2b illustrates an example of an apparatus 20 according to another embodiment. In an embodiment, apparatus 20 may be a node or element in a communications network or associated with such a network, such as a UE, mobile device, mobile unit, machine type UE or other device. For instance, in some embodiments, apparatus 20 may be UE in LTE or LTE-A. It should be noted that one of ordinary skill in the art would understand that apparatus 20 may include components or features not shown in FIG. 2b.

As illustrated in FIG. 2b, apparatus 20 includes a processor 32 for processing information and executing instructions or operations. Processor 32 may be any type of general or specific purpose processor. While a single processor 32 is shown in FIG. 2b, multiple processors may be utilized according to other embodiments. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 20 may further include or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 34 can be comprised of any combination of random access memory (RAM), read only memory (ROM), static storage such as a magnetic or optical disk, or any other type of non-transitory machine or computer readable media. The instructions stored in memory 34 may include program instructions or computer program code that, when executed by processor 32, enable the apparatus 20 to perform tasks as described herein.

In some embodiments, apparatus 20 may also include or be coupled to one or more antennas 35 for transmitting and receiving signals and/or data to and from apparatus 20. Apparatus 20 may further include a transceiver 38 configured to transmit and receive information. For instance, transceiver 38 may be configured to modulate information on to a carrier waveform for transmission by the antenna(s) 35 and demodulate information received via the antenna(s) 35 for further processing by other elements of apparatus 20. In other embodiments, transceiver 38 may be capable of transmitting and receiving signals or data directly.

Processor 32 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

In an embodiment, memory 34 stores software modules that provide functionality when executed by processor 32. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

As mentioned above, according to one embodiment, apparatus 20 may be a mobile device, such as a UE in LTE or LTE-A. In one embodiment, apparatus 20 may be controlled by at least one memory 34 and at least one processor 32 to, when apparatus 20 attaches to EPC, send an indication that apparatus 20 is a high latency device. In an embodiment, the indication may include an "active time" request (i.e., sending a PSM indication), an eDRX time request (i.e., sending an indication for requesting extended paging cycle in idle mode), a request for a specific APN, or other alternatives. Apparatus 20 may then be assigned an IP address selected from a special IP address range that is designated specifically for high latency devices. Apparatus 20 may be controlled by at least one memory 34 and at least one processor 32 to perform IMS registration, and the network (e.g., P-CSCF) is able to determine that apparatus 20 is a high latency device based on the IP address provided with the IMS registration request and assigned during the EPC attach procedure.

In another embodiment, apparatus 20 may be controlled by at least one memory 34 and at least one processor 32 to send an explicit indication, to the IMS, that apparatus 20 is no longer reachable. In one example embodiment, the explicit indication may be sent in a new SIP header field or a header field parameter of a SIP message. According to an embodiment, apparatus 20 may be controlled by at least one memory 34 and at least one processor 32 to send information regarding future availability of apparatus 20. For example, the information regarding future availability may include the time/date of the next wake-up period. In another example, apparatus 20 may be controlled by at least one memory 34 and at least one processor 32 to send more versatile information about future availability of apparatus 20, such as regular cycles or a series of periods of availability. According to one embodiment, whenever apparatus 20 is awake again, apparatus 20 may be controlled by at least one memory 34 and at least one processor 32 to send an explicit indication that apparatus 20 is now reachable.

Figure 3A:
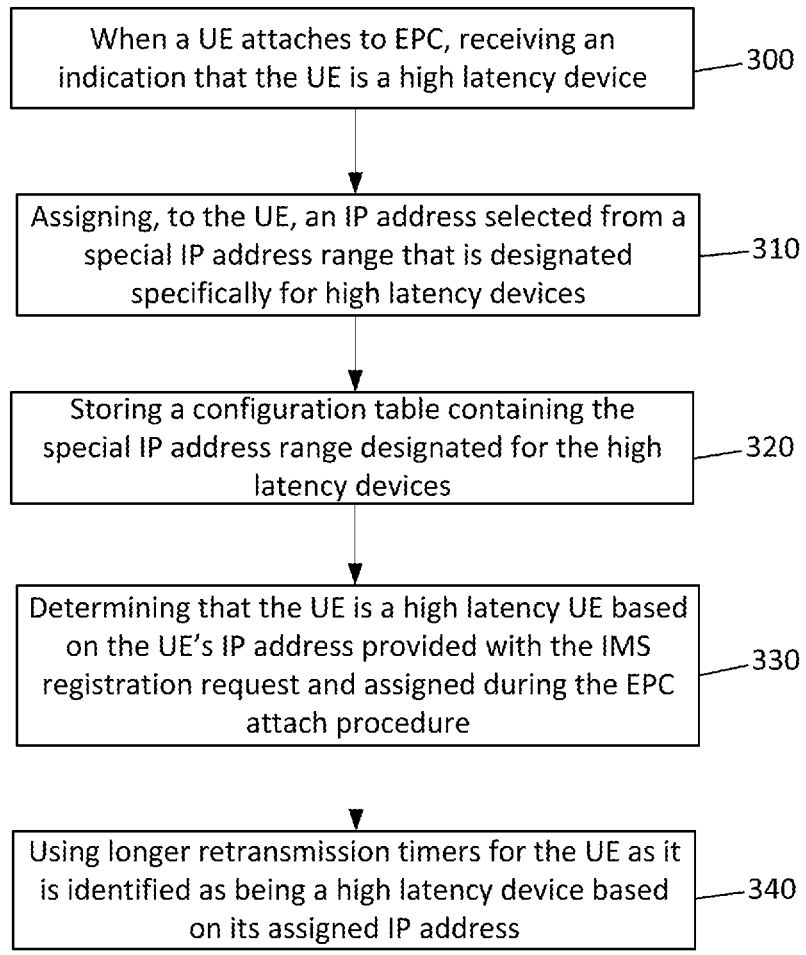
FIG. 3a illustrates a flow diagram of a method, according to an embodiment.

FIG. 3a illustrates an example flow diagram of a method, according to one embodiment of the invention. In certain embodiments, the method of FIG. 3a may be performed by a network node, such as a packet data network gateway and/or a P-CSCF. As illustrated in FIG. 3a, the method may include, at 300, when a UE attaches to EPC, receiving an indication that the UE is a high latency device. In an embodiment, the indication may include an "active time" request (i.e., receiving a PSM indication), an eDRX time request (i.e., receiving an indication for requesting extended paging cycle in idle mode), a request for a specific APN, or other alternatives. The method may also include, at 310, assigning, to the UE, an IP address selected from a special IP address range that is designated specifically for high latency devices. In an embodiment, the method may also include, at 320, storing a configuration table containing the special IP address range designated for the high latency devices. When the UE performs IMS registration, the method may include, at 330, determining that the UE is a high latency UE based on the UE's IP address provided with the IMS registration request and assigned during the EPC attach procedure. In one embodiment, the method may then include, at 340, using longer retransmission timers for the UE as it is identified as being a high latency device based on its assigned IP address.

Figure 3B:
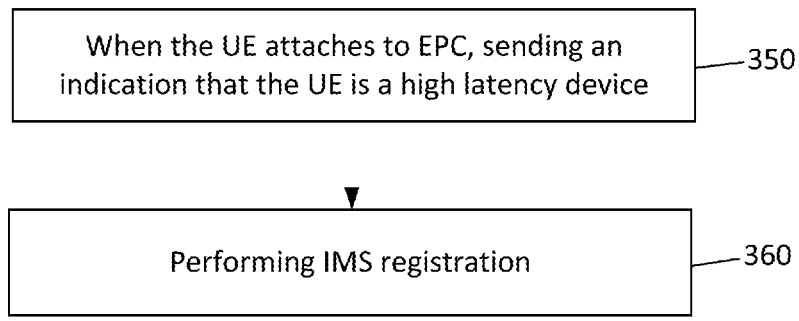
FIG. 3b illustrates a flow diagram of a method, according to an embodiment.

FIG. 3b illustrates an example flow diagram of a method, according to another embodiment of the invention. In certain embodiments, the method of FIG. 3b may be performed by a device, such as a UE in LTE or LTE-A. As illustrated in FIG. 3b, the method may include, at 350, when the UE attaches to EPC, sending an indication that the UE is a high latency device. In an embodiment, the indication may include an "active time" request (i.e., sending a PSM indication), an eDRX time request (i.e., sending an indication for requesting extended paging cycle in idle mode), a request for a specific APN, or other alternatives. The UE may then be assigned, for example by a PGW, an IP address selected from a special IP address range that is designated specifically for high latency devices. The method may also include, at 360, the UE performing IMS registration, and the network (e.g., P-CSCF) is able to determine that the UE is a high latency device based on the IP address provided with the IMS registration request and assigned during the EPC attach procedure.

Figure 4A:
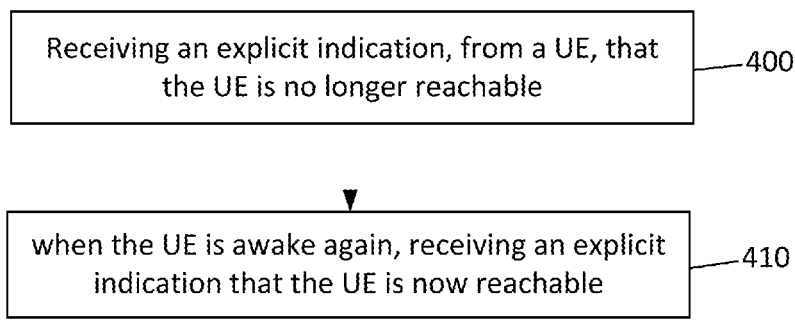
FIG. 4a illustrates a flow diagram of a method, according to an embodiment.

FIG. 4a illustrates an example flow diagram of a method, according to one embodiment of the invention. In certain embodiments, the method of FIG. 4a may be performed by a network node, such as a S-CSCF. As illustrated in FIG. 4a, the method may include, at 400, receiving an explicit indication, from a UE, that the UE is no longer reachable. In one example embodiment, the explicit indication may be received in a new SIP header field or a header field parameter of a SIP message. According to an embodiment, the receiving may further include receiving information regarding future availability of the UE. For example, the information regarding future availability may include the time/date of the next wake-up period. In another example, the receiving may also include receiving more versatile information about future availability of the UE, such as regular cycles or a series of periods of availability. According to one embodiment, whenever the UE is awake again, the method may include, at 410, receiving an explicit indication that the UE is now reachable.

Figure 4B:
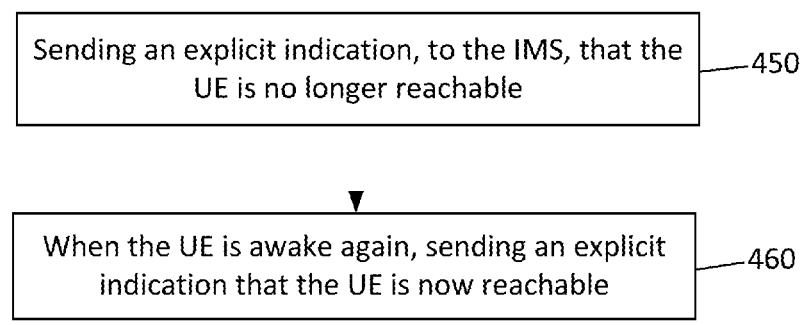
FIG. 4b illustrates a flow diagram of a method, according to an embodiment.

FIG. 4b illustrates an example flow diagram of a method, according to another embodiment of the invention. In certain embodiments, the method of FIG. 4b may be performed by a device, such as a UE in LTE or LTE-A. As illustrated in FIG. 4b, the method may include, at 450, sending an explicit indication, to the IMS, that the UE is no longer reachable. In one example embodiment, the explicit indication may be sent in a new SIP header field or a header field parameter of a SIP message. According to an embodiment, the sending may include sending information regarding future availability of the UE. For example, the information regarding future availability may include the time/date of the next wake-up period. In another example, the sending may also include sending more versatile information about future availability of the UE, such as regular cycles or a series of periods of availability. According to one embodiment, whenever the UE is awake again, the method may also include, at 460, sending an explicit indication that the UE is now reachable.

Figure 5:
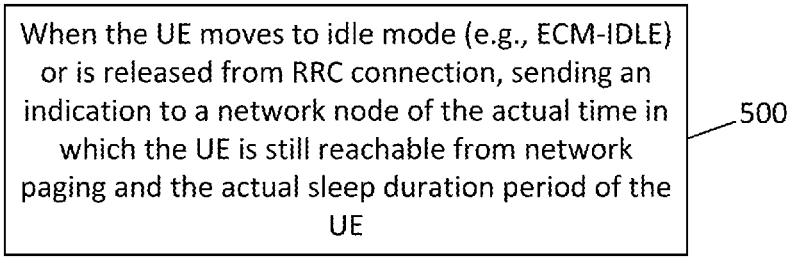
FIG. 5 illustrates a flow diagram of a method, according to an embodiment.

FIG. 5 illustrates an example flow diagram of a method, according to one embodiment of the invention. In certain embodiments, the method of FIG. 5 may be performed by a network node, such as a MME. As illustrated in FIG. 5, the method may include, at 500, when the UE moves to idle mode (e.g., ECM-IDLE) or is released from RRC connection, sending an indication to a network node (e.g., P-GW, PCRF, and/or P-CSCF) of the actual time in which the UE is still reachable from network paging and the actual sleep duration period of the UE.

Figure 6:
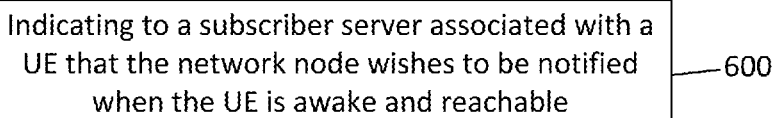
FIG. 6 illustrates a flow diagram of a method, according to an embodiment.
Figure 6:
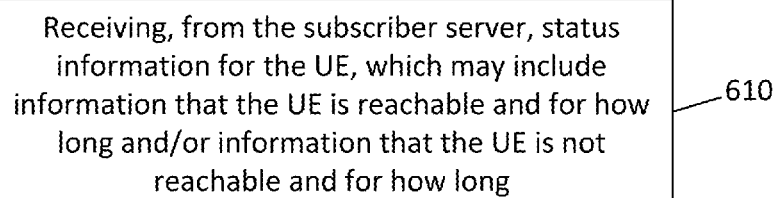

FIG. 6 illustrates an example flow diagram of a method, according to one embodiment of the invention. In certain embodiments, the method of FIG. 6 may be performed by a network node, such as an IMS access server. As illustrated in FIG. 6, the method may include, at 600, indicating to a subscriber server (e.g., HSS) associated with a UE that the network node wishes to be notified when the UE is awake and reachable. The subscriber server may then send a request to a MME to send a notification to the subscriber server when the UE is reachable again and for how long it is reachable. When the UE becomes active, the MME may inform the subscriber server that the UE is reachable and inform the subscriber server of the duration of reachability. The MME may also notify the subscriber server of when the UE is going back to sleep and for how long it is going back to sleep. The method may then include, at 610, receiving, from the subscriber server, status information for the UE, which may include information that the UE is reachable and for how long and/or information that the UE is not reachable and for how long. The network node may then take this information into account and avoid sending terminating SIP messages to the UE during its sleep period.

According to embodiments, programs, also called program products or computer programs, including software routines, applets and macros, may be stored in any apparatus-readable data storage medium and they include program instructions to perform particular tasks. A computer program product may comprise one or more computer-executable components which, when the program is run, are configured to carry out embodiments. The one or more computer-executable components may be at least one software code or portions of it. Modifications and configurations required for implementing functionality of an embodiment may be performed as routine(s), which may be implemented as added or updated software routine(s). Software routine(s) may be downloaded into the apparatus.

Software or a computer program code or portions of it may be in a source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other embodiments, the functionality of any method or apparatus described herein may be performed by hardware, for example through the use of an application specific integrated circuit (ASIC), a programmable gate array (PGA), a field programmable gate array (FPGA), or any other combination of hardware and software. In yet another embodiment, the functionality may be implemented as a signal, a non-tangible means that may be carried by an electromagnetic signal downloaded from the Internet or other network.

According to an embodiment, an apparatus, such as a node, device, or a corresponding component, may be configured as a computer or a microprocessor, such as single-chip computer element, or as a chipset, including at least a memory for providing storage capacity used for arithmetic operation and an operation processor for executing the arithmetic operation.

One embodiment is directed to an apparatus that may include at least one processor, and at least one memory comprising computer program code. The at least one memory and the computer program code are configured, with the at least one processor, to cause the apparatus at least to, when a UE attaches to EPC, receive an indication that the UE is a high latency device. In an embodiment, the indication may include an "active time" request (i.e., receiving a PSM indication), an eDRX time request (i.e., receiving an indication for requesting extended paging cycle in idle mode), a request for a specific APN, or other alternatives. The at least one memory and the computer program code are further configured, with the at least one processor, to cause the apparatus at least to assign, to the UE, an IP address selected from a special IP address range that is designated specifically for high latency devices. In an embodiment, the at least one memory and the computer program code are configured, with the at least one processor, to cause the apparatus at least to store a configuration table containing the special IP address range designated for the high latency devices. When the UE performs IMS registration, the apparatus is able to determine that the UE is a high latency UE based on the UE's IP address provided with the IMS registration request and assigned during the EPC attach procedure. In one embodiment, the at least one memory and the computer program code are configured, with the at least one processor, to cause the apparatus at least to use longer retransmission timers for the UE as it is identified as being a high latency device based on its assigned IP address.

Another embodiment is directed to an apparatus that may include at least one processor, and at least one memory comprising computer program code. The at least one memory and the computer program code are configured, with the at least one processor, to cause the apparatus at least to receive an explicit indication, from a UE, that the UE is no longer reachable. In one example embodiment, the explicit indication may be received in a new SIP header field or a header field parameter of a SIP message. According to an embodiment, the at least one memory and the computer program code are configured, with the at least one processor, to cause the apparatus at least to receive information regarding future availability of the UE. For example, the information regarding future availability may include the time/date of the next wake-up period. In another example, the at least one memory and the computer program code are configured, with the at least one processor, to cause the apparatus at least to receive more versatile information about future availability of the UE, such as regular cycles or a series of periods of availability. According to one embodiment, whenever the UE is awake again, the at least one memory and the computer program code are configured, with the at least one processor, to cause the apparatus at least to receive an explicit indication that the UE is now reachable.

In another embodiment, the at least one memory and the computer program code are configured, with the at least one processor, to cause the apparatus at least to, when the UE moves to idle mode (e.g., ECM-IDLE) or is released from RRC connection, send an indication to a network node (e.g., P-GW, PCRF, and/or P-CSCF) of the actual time in which the UE is still reachable from network paging and the actual sleep duration period.

In another embodiment, the at least one memory and the computer program code are configured, with the at least one processor, to cause the apparatus at least to indicate to a subscriber server (e.g., HSS) associated with a UE that apparatus 10 wishes to be notified when the UE is awake and reachable. The subscriber server may then send a request to a MME to send a notification to the subscriber server when the UE is reachable again and for how long it is reachable. When the UE becomes active, the MME may inform the subscriber server that the UE is reachable and inform the subscriber server of the duration of reachability. The MME may also notify the subscriber server of when the UE is going back to sleep and for how long it is going back to sleep. The at least one memory and the computer program code are configured, with the at least one processor, to cause the apparatus at least to receive, from the subscriber server, status information for the UE, which may include information that the UE is reachable and for how long and/or information that the UE is not reachable and for how long. The apparatus may then take this information into account and avoid sending terminating SIP messages to the UE during its sleep period.

Another embodiment is directed to a method that may include, when a UE attaches to EPC, receiving, at a network node, an indication that the UE is a high latency device. In an embodiment, the indication may include an "active time" request (i.e., receiving a PSM indication), an eDRX time request (i.e., receiving an indication for requesting extended paging cycle in idle mode), a request for a specific APN, or other alternatives. The method may also include assigning, to the UE, an IP address selected from a special IP address range that is designated specifically for high latency devices. In an embodiment, the method may also include storing a configuration table containing the special IP address range designated for the high latency devices. When the UE performs IMS registration, the method may include determining that the UE is a high latency UE based on the UE's IP address provided with the IMS registration request and assigned during the EPC attach procedure. In one embodiment, the method may then include using longer retransmission timers for the UE as it is identified as being a high latency device based on its assigned IP address.

Another embodiment is directed to a method that may include receiving, by a network node, an explicit indication, from a UE, that the UE is no longer reachable. In one example embodiment, the explicit indication may be received in a new SIP header field or a header field parameter of a SIP message. According to an embodiment, the receiving may further include receiving information regarding future availability of the UE. For example, the information regarding future availability may include the time/date of the next wake-up period. In another example, the receiving may also include receiving more versatile information about future availability of the UE, such as regular cycles or a series of periods of availability. According to one embodiment, whenever the UE is awake again, the method may include receiving an explicit indication that the UE is now reachable.

Another embodiment is directed to a method that may include, when the UE moves to idle mode (e.g., ECM-IDLE) or is released from RRC connection, sending an indication to a network node (e.g., P-GW, PCRF, and/or P-CSCF) of the actual time in which the UE is still reachable from network paging and the actual sleep duration period of the UE.

Another embodiment is directed to a method that may include indicating, by a network node, to a subscriber server (e.g., HSS) associated with a UE that the network node wishes to be notified when the UE is awake and reachable. The subscriber server may then send a request to a MME to send a notification to the subscriber server when the UE is reachable again and for how long it is reachable. When the UE becomes active, the MME may inform the subscriber server that the UE is reachable and inform the subscriber server of the duration of reachability. The MME may also notify the subscriber server of when the UE is going back to sleep and for how long it is going back to sleep. The method may also include receiving, from the subscriber server, status information for the UE, which may include information that the UE is reachable and for how long and/or information that the UE is not reachable and for how long. The network node may then take this information into account and avoid sending terminating SIP messages to the UE during its sleep period.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
   subscribing, by an access server, to event notifications in an access domain for at least one user equipment,
       wherein the subscribing comprises indicating to a subscriber server that the access server wants to receive status information for the at least one user equipment; and
   receiving, from the subscriber server, status information for the at least one user equipment,
       wherein the status information comprises
           an indication of a future availability of the at least one user equipment, the future availability comprising regular cycles or a series of periods of availability of the at least one user equipment, and
           an indication of time in which the at least one user equipment is still reachable from a network, sent when the at least one user equipment goes to idle from connected mode, and indicating an actual sleep period thereafter.

2. The method according to claim 1, wherein the status information comprises an indication of when the at least one user equipment is awake and reachable.

3. The method according to claim 1, wherein the status information further comprises an indication of how long the at least one user equipment will be reachable.

4. The method according to claim 1, wherein the status information further comprises an indication that the at least one user equipment is not reachable and an indication of how long the at least one user equipment will not be reachable.

5. The method according to claim 1, further comprising determining whether to send terminating session initiation protocol messages based on the status information.

6. An apparatus, comprising:
   at least one processor; and
   at least one memory including computer program code;
   the at least one memory and the computer program code are configured, with the at least one processor, to cause the apparatus at least to
   subscribe to event notifications in an access domain for at least one user equipment,
       wherein the subscribing comprises indicating to a subscriber server that the apparatus wants to receive status information for the at least one user equipment; and
   receive, from the subscriber server, status information for the at least one user equipment,
       wherein the status information comprises
           an indication of a future availability of the at least one user equipment, the future availability comprising regular cycles or a series of periods of availability of the at least one user equipment, and
           an indication of time in which the at least one user equipment is still reachable from a network, sent when the at least one user equipment goes to idle from connected mode, and indicating an actual sleep period thereafter.

7. The apparatus according to claim 6, wherein the status information comprises an indication of when the at least one user equipment is awake and reachable.

8. The apparatus according to claim 6, wherein the status information further comprises an indication of how long the at least one user equipment will be reachable.

9. The apparatus according to claim 6, wherein the status information comprises an indication that the at least one user equipment is not reachable and an indication of how long the at least one user equipment will not be reachable.

10. The apparatus according to claim 6, wherein the at least one memory and the computer program code are further configured, with the at least one processor, to cause the apparatus at least to determine whether to send terminating session initiation protocol messages based on the status information.

11. A method, comprising:
    receiving, at a subscriber server associated with at least one user equipment, an indication that an access server wants to receive status information in an access domain for the at least one user equipment;
    sending a request to a mobility management entity to be notified when the least one user equipment is active;

when the at least one user equipment becomes active, receiving an indication that the at least one user equipment is active and an indication of a duration that the at least one user equipment will be active; and sending the status information for the at least one user equipment to the access server, wherein the status information comprises the indication that the at least one user equipment is active and the indication of a duration that the at least one user equipment will be active, wherein the status information further comprises an indication of a future availability of the at least one user equipment, the future availability comprising regular cycles or a series of periods of availability of the at least one user equipment, and an indication of time in which the at least one user equipment is still reachable from a network, sent when the at least one user equipment goes to idle from connected mode, and indicating an actual sleep period thereafter.

12. The method according to claim 11, further comprising receiving an indication from the mobility management entity when the at least one user equipment is going back to sleep and an indication of the duration of the sleep.

13. An apparatus, comprising:
at least one processor; and
at least one memory including computer program code;
the at least one memory and the computer program code are configured, with the at least one processor, to cause the apparatus at least to receive an indication that an access server wants to receive status information in an access domain for at least one user equipment;

send a request to a mobility management entity to be notified when the least one user equipment is active;

when the at least one user equipment becomes active, receive an indication that the at least one user equipment is active and an indication of a duration that the at least one user equipment will be active; and send the status information for the at least one user equipment to the access server, wherein the status information comprises the indication that the at least one user equipment is active and the indication of a duration that the at least one user equipment will be active, wherein the status information further comprises an indication of a future availability of the at least one user equipment, the future availability comprising regular cycles or a series of periods of availability of the at least one user equipment, and an indication of time in which the at least one user equipment is still reachable from a network, sent when the at least one user equipment goes to idle from connected mode, and indicating an actual sleep period thereafter.

14. The apparatus according to claim 13, wherein the at least one memory and the computer program code are configured, with the at least one processor, to cause the apparatus at least to receive an indication from the mobility management entity when the at least one user equipment is going back to sleep and an indication of the duration of the sleep.

15. A computer program, embodied on a non-transitory computer readable medium, the computer program configured to control a processor to perform a process according to claim 1.

16. A computer program, embodied on a non-transitory computer readable medium, the computer program configured to control a processor to perform a process according to claim 11.

* * * * *